(12) United States Patent
Sekizawa

(10) Patent No.: US 7,948,365 B2
(45) Date of Patent: May 24, 2011

(54) TIRE AIR PRESSURE MONITORING SYSTEM

(75) Inventor: Takatoshi Sekizawa, Kariya (JP)

(73) Assignee: Denso Corporation, Kariya (JP)

( * ) Notice: Subject to any disclaimer, the term of this patent is extended or adjusted under 35 U.S.C. 154(b) by 302 days.

(21) Appl. No.: 12/398,563

(22) Filed: Mar. 5, 2009

(65) Prior Publication Data

US 2009/0224903 A1 Sep. 10, 2009

(30) Foreign Application Priority Data

Mar. 7, 2008 (JP) ................................. 2008-58420

(51) Int. Cl.
*G08B 21/00* (2006.01)

(52) U.S. Cl. ........ 340/447; 340/442; 340/445; 340/446; 340/448; 343/702; 343/814; 343/815; 343/860; 73/146; 73/146.2; 73/146.4; 73/146.5

(58) Field of Classification Search .................. 340/447, 340/442, 445, 446, 448; 343/702, 814, 815, 343/860; 73/146, 146.2–146.5

See application file for complete search history.

(56) References Cited

U.S. PATENT DOCUMENTS

| 6,049,310 | A | 4/2000 | Sadahiro |
| 6,667,687 | B1 * | 12/2003 | DeZorzi ........................ 340/447 |
| 6,985,076 | B1 * | 1/2006 | Bennie et al. ................. 340/445 |
| 2007/0279205 | A1 | 12/2007 | Ide et al. |

FOREIGN PATENT DOCUMENTS

WO 97/38869 10/1997

* cited by examiner

*Primary Examiner* — Tai T Nguyen

(74) *Attorney, Agent, or Firm* — Nixon & Vanderhye PC

(57) ABSTRACT

A tire air pressure monitoring system has a plurality of sensor units and a receiver. The pressure sensor units are mounted near corresponding tires to measure tire air pressures and transmit transmission signals indicating the respective measured tire air pressures. The receiver has an antenna element, a variable capacitor and a power supply source. The variable capacitor is coupled to the antenna element. The power supply source supplies electric power to the antenna element. The voltage supplied to the variable capacitor is controlled so that a current flowing in the antenna element is changed and its directivity is changed. Thus, the transmission signals will be received more surely.

5 Claims, 2 Drawing Sheets

TIRE AIR PRESSURE MONITORING SYSTEM

CROSS REFERENCE TO RELATED APPLICATION

This application is based on and incorporates herein by reference Japanese Patent Application No. 2008-58420 filed on Mar. 7, 2008.

FIELD OF THE INVENTION

The present invention relates to a tire air pressure monitoring system, which monitors air pressures of tires of a vehicle.

BACKGROUND OF THE INVENTION

A conventional tire air pressure monitoring system, which monitors the air pressure of each tire of a vehicle, is disclosed in WO 97/38869, for example. This tire air pressure monitoring system includes a tire air pressure sensor, a transmitter and a receiver. The tire air pressure sensor and the transmitter are mounted near each tire. Each transmitter transmits a radio signal including a detected tire air pressure, and the receiver receives the radio signals of the transmitters. Thus, the tire air pressure of each tire is monitored based on the radio signals received by the receiver.

The radio signal of each transmitter, that is, a transmission signal transmitted from the transmitter, is likely to propagate in other directions different from the intended direction or in reduced signal strength for some reasons. For example, if the receiver is mounted on a ceiling roof part of the vehicle, there exists a vehicle compartment between the transmitter and the receiver. As a result, the direction of propagation of the transmission signal will be changed or the signal strength of the transmission signal will be reduced by passengers or luggage in the vehicle compartment.

In the conventional tire air pressure monitoring system, the directivity of the receiver is so set that the sensitivity of receiving the transmission signal is most suited in accordance with the position of the transmitter or the like. If the change in the propagation direction or the reduction in the signal strength of the transmission signal arises, the sensitivity of receiving the transmission signal will be reduced and the transmission signal will not be received.

SUMMARY OF THE INVENTION

It is therefore an object of the present invention to provide a tire air pressure monitoring system, which can reduce cases where a transmission signal cannot be received.

According to one aspect, a tire air pressure monitoring system for a vehicle is configured by a plurality of transmitters, a receiver and an electronic control unit. The transmitters are provided near tires of a vehicle. Each of the transmitters includes a tire air pressure sensor for detecting an air pressure of the tire, and transmits as a radio wave a transmission signal indicating the air pressure detected by the tire air pressure sensor. The receiver receives the transmission signal from each transmitter so that a tire air pressure of each tire is monitored based on the transmission signal received by the receiver. The receiver includes an antenna element, a variable impedance element coupled to the antenna element, and a power supply source for supplying the antenna element with electric power. The control unit controls the directivity of the receiver by controlling a voltage supplied to the variable impedance element.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

Figure 1:
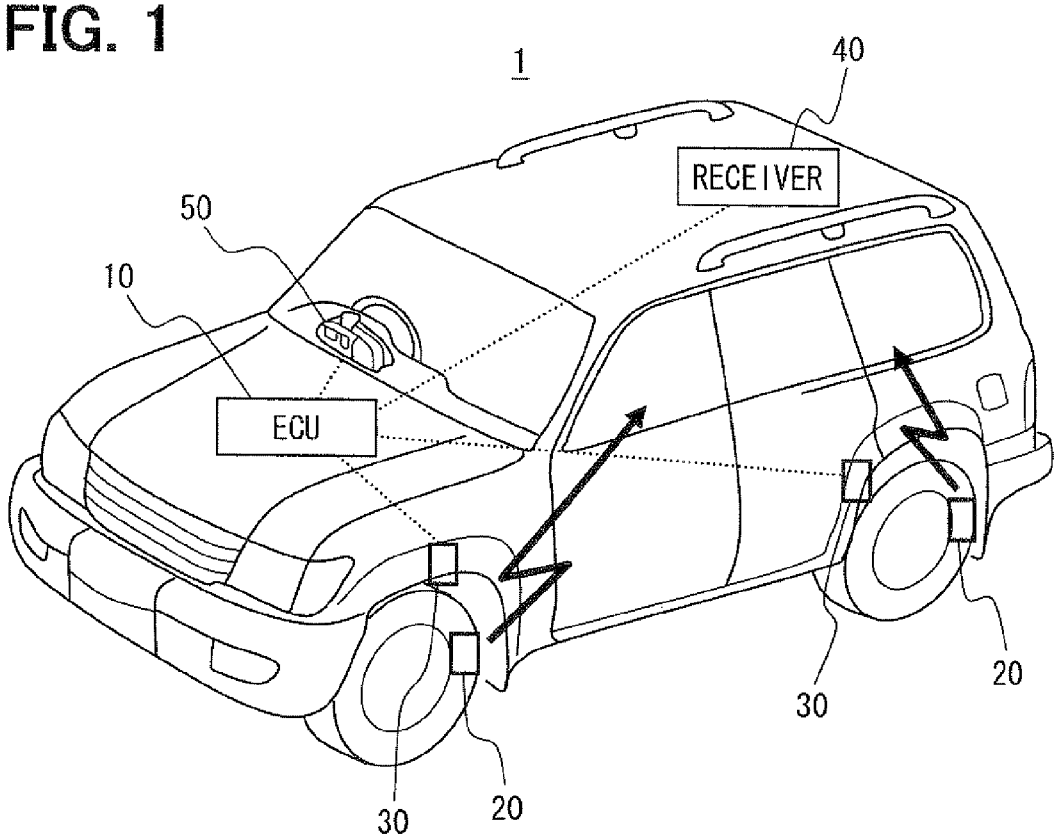
FIG. 1 is a schematic view showing a tire air pressure monitoring system according to one embodiment of the present invention.

Referring first to FIG. 1, a tire air pressure monitoring system 1 for a vehicle includes an electronic control unit (control ECU) 10, sensor units 20, trigger units 30, a receiver 40 and a display 50. The sensor units 20 and the trigger units 30 are provided for four tires of the vehicle, respectively.

Each sensor unit 20 is configured integrally with a tire valve or attached directly to a disk wheel of the corresponding tire.

The sensor unit 20 has an air pressure sensor for measuring a tire air pressure, a signal generator section for generating a transmission signal including information of the measured air pressure and an ID code of the corresponding tire (sensor unit 20, trigger unit 30), a transmitter section for transmitting the transmission signal in the form of a radio signal using a carrier wave of about several hundreds of megahertz (MHz) band, and a receiver section for receiving a trigger signal.

Each trigger unit 30 is mounted near the corresponding tire, for example, on a wheel axle, a steering knuckle or a suspension arm housing, to transmit the trigger signal to the receiver section of the sensor unit 20. The trigger unit 30 may be a coil antenna. Upon receiving the trigger signal from the trigger unit 30, the sensor unit 20 measures the air pressure in the corresponding tire, and generates and transmits the transmission signal.

The receiver 40 is for receiving the transmission signals transmitted from the sensor units 20, and mounted at a position where all of the transmission signals can be received. Such a position may be on a roof panel above the rear seat of the vehicle.

The display 50 is provided on an instrument panel in the vehicle compartment, for instance, to display the result of monitoring tire air pressures.

The control ECU 10 is connected to the trigger units 30, the receiver 40 and the display 50. The control ECU 10 is configured to instruct, as a transmission instruction section, a transmission of the trigger signal to each trigger unit 30, and acquires the transmission signal which the receiver 40 receives. Since the transmission includes the information of the measured tier air pressure, the control ECU 10 monitors the air pressure of each tire based on the transmission signal acquired from the receiver 40. The control ECU 10 drives the display 50 to provide an alarm or warning, if necessary, that is, if the measured tire air pressure is not normal.

The control ECU 10 is also configured as a directivity control section to check whether the transmission signals are received from all of the sensor units 20, and control the directivity of signal reception of the receiver 40 based on the check result.

Figure 2:
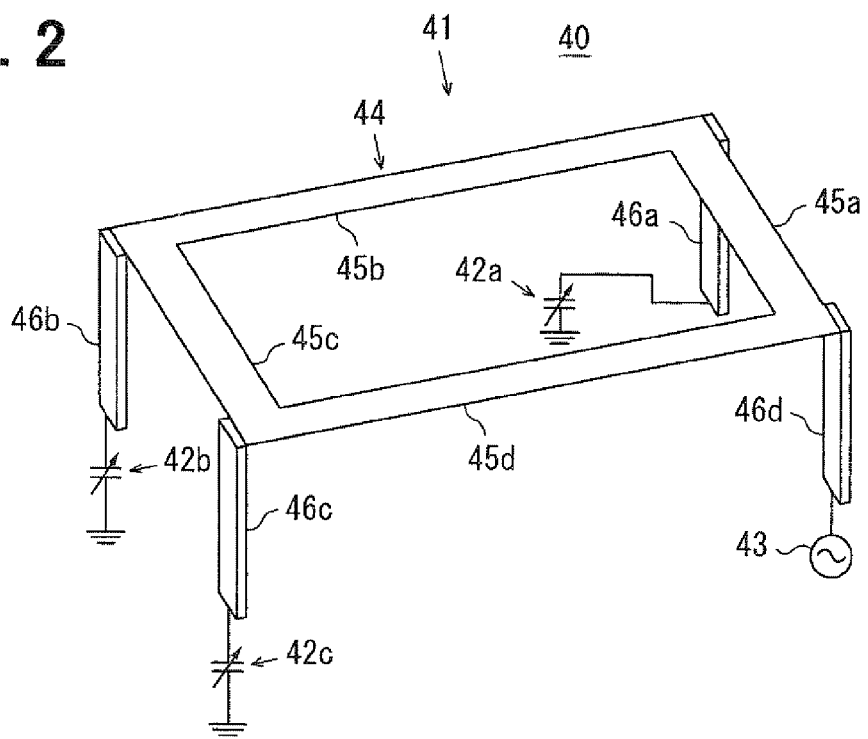
FIG. 2 is a schematic diagram showing a receiver used in the embodiment.

As shown in FIG. 2, the receiver 40 includes an antenna element 41, a variable capacitor 42 (42a to 42c) as a variable impedance element, and a power supply source 43. The antenna element 41 and the variable capacitor 42 are encased within a casing (not shown).

The antenna element 41 has a loop section 44 and four leg sections 46a to 46d. The loop section 44 is formed in a rectangular frame shape by four plate parts 45a to 45d. The leg sections 46a to 46d extend perpendicularly from the four corners of the rectangular frame shape. The power supply source 43 is connected to one end of the leg section 46d. Three variable capacitors 42a to 42c are connected to the remaining three leg sections 46a to 46c at one ends, respectively, and grounded at the other ends.

The variable capacitor 42 is equivalent to a variable capacitance diode, and varies its capacitance in accordance with a bias voltage. The control ECU 10 is further configured as a voltage control section to control the bias voltage applied to the variable capacitor 42.

The receiver 40 includes a receiver circuit (not shown) configured to extract the transmission signal by amplifying and wave-detecting the signal received by the antenna element 41 and transmit the extracted transmission signal to the control ECU 10.

The receiver 40 is configured to variably set its directivity of receiving the transmission signals as described below.

It is assumed that the capacitance of the variable capacitor 42a is set large and the capacitances of the other two variable capacitors 42a and 42b are set much smaller than that of the variable capacitor 42a. In this case, the current mostly flows from the power supply source 43 to the leg section 46a through the plate part 45a. The directivity becomes higher in the right side (opposite side from the loop section 44) in the figure relative to the plane, which includes the leg section 46d, the plate section 45a and the leg section 46a.

It is assumed next that the capacitance of the variable capacitor 42c is set large and the capacitances of the other two variable capacitors 42a and 42b are set much smaller than that of the variable capacitor 42c. In this case, the current mostly flows from the power supply source 43 to the leg section 46c through the plate part 45d. The directivity becomes higher in the front side (opposite side from the loop section 44) in the figure relative to the plane, which includes the leg section 46d, plate part 45d and the leg section 46c.

Thus it is possible to control the direction of current that flows in the antenna element 41 by controlling the capacitances of the variable capacitors 42a to 42c.

It is also assumed differently from the above two assumed examples that the current flows from the leg section 46d to the leg section 46b through the plate parts 45a and 45b. In this case, the directivity becomes higher in the right side in the figure relative to the plane, which includes the leg sections 46a, 46d and the plate part 45a and in the rear side in the figure relative to the plane, which includes the leg sections 46a, 46b and the plate part 45b. Thus, it is possible to vary the directivity by controlling the capacitances of the variable capacitors 42a to 42c.

Figure 3:
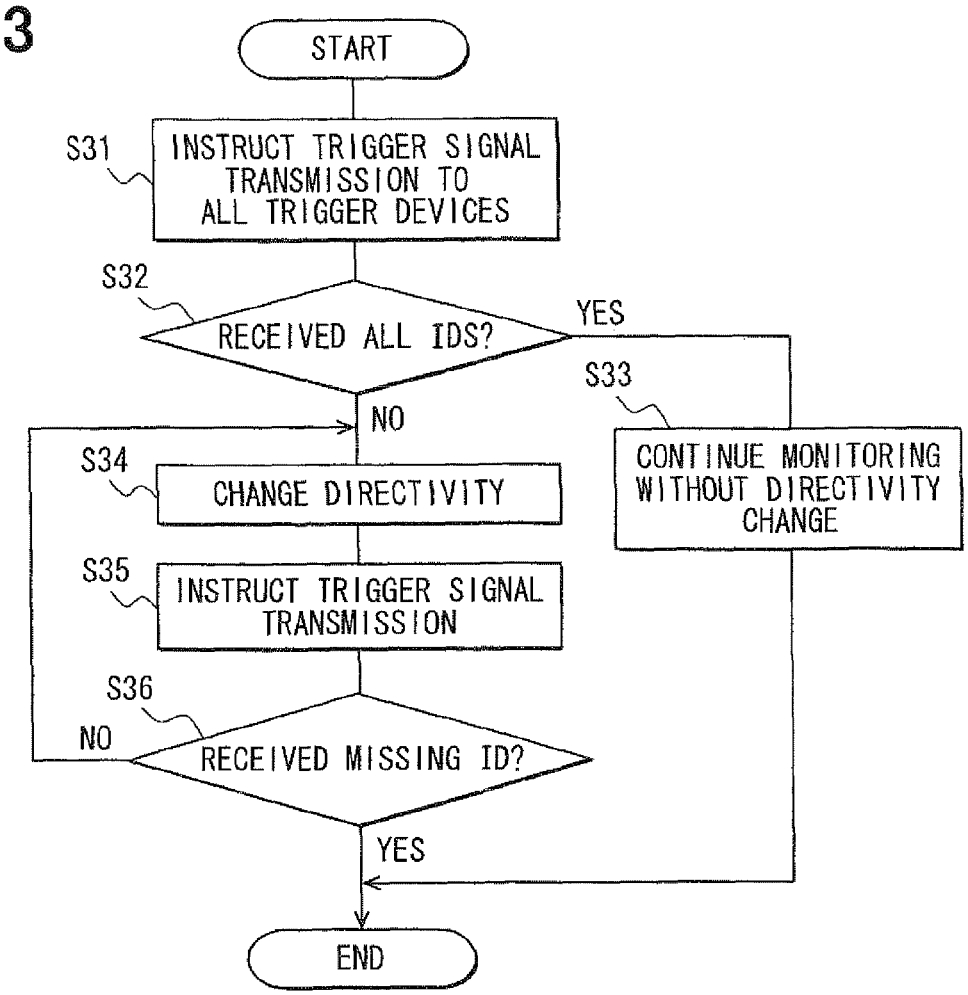
FIG. 3 is a flowchart showing directivity control processing executed by an electronic control unit in the embodiment.

The control ECU 10 is configured and programmed to execute directivity control processing (function of the directivity control section) as shown in FIG. 3. This processing is executed periodically at every predetermined interval.

First at S31, transmission of a trigger signal is instructed to all the trigger units 30. This instruction may be issued to all the trigger units 30 at the same time or in a predetermined sequence order. A trigger signal is transmitted from each trigger unit 30 to the corresponding sensor unit 20.

Each sensor unit 20 transmits a transmission signal including a detected air pressure value and its ID code in response to the trigger signal. When the transmission signal is received by the receiver 40, the transmission signal is supplied to the control ECU 10 from the receiver 40. If the transmission of the transmission signal from the sensor unit 20 is interrupted by passengers or the like in the vehicle compartment, the transmission signal of the sensor unit 20 will not be received by the receiver 40 and transmitted to the control ECU 10 either.

It is therefore checked at S32 whether all the ID codes have been received thereby to check whether all the sensor units 20 have detected the air pressures of the corresponding tires.

If all the transmission signals including ID codes of respective tires (sensor units 20, trigger units 30) have been received, S33 is executed so that the tire air pressure monitoring is continued without changing directivity. The processing ends after S33 until the predetermined time interval elapses.

If any one of the IDs has not been received, S34 is executed to vary the capacitances of the variable capacitors 42a to 42c and change the directivity. The capacitances of the variable capacitors 42a to 42c may be varied based on the particular one of the sensor units 20 identified by the ID, that is, sensor unit 20 from which no transmission signal has been received. Alternatively the capacitances may be varied in the predetermined order sequentially and irrespectively of such a particular sensor unit 20.

At S35, the particular sensor unit 20 from which no transmission signal has been received is identified based on the ID code, and the transmission of the trigger signal is instructed to a particular one of the trigger units 30 corresponding to such an identified particular sensor unit 20 again.

At S36, it is checked whether the transmission signal including the ID code (missing ID code), which had not been received, has been received. If it has been received, the processing ends. In this instance, the above processing is executed after an elapse of the predetermined time interval.

If the transmission signal including the missing ID code has not been received again, the processing of S34 and 35 are repeated. Thus, the directivity is changed until the transmission signal including the missing ID code is successfully received.

According to the embodiment, the receiver 40 is configured so that the variable capacitor 42 is connected to the antenna element 41 and the voltage supplied to the variable capacitor 42 is controlled to thereby change the directivity. It is noted that if the voltage supplied to the variable capacitor 42 is varied, the current flowing in the antenna is changed, the magnetic field generated by the current is changed and, as a result, the directivity is changed. The directivity is changed by controlling the voltage supplied to the variable capacitors 42, if any one of the transmission signals of the sensor units 20 has not been received. Therefore, even if the originally set directivity is not proper for receiving the transmission signals of all the sensor units 20, the sensitivity of the receiver 40 to the transmission signals can be increased by changing the directivity of the antenna element 41. As a result, the transmission signals can be received more easily.

The present invention is not limited to the disclosed embodiment but may be implemented in other ways.

For example, the trigger units 30 need not be provided and the sensor units 20 may be configured to perform the tire air pressure detection and the transmission signal transmission at a predetermined interval. In this case, the control ECU 10 may be programmed to check at S32 whether all the ID codes (transmission signals of all the sensor units 20) are received within a predetermined check period.

The antenna element 41 of the receiver 40 may be in different configurations and the number and the positions of connection of the variable capacitor 42 may be different from the embodiment (FIG. 3).

Figure 4:
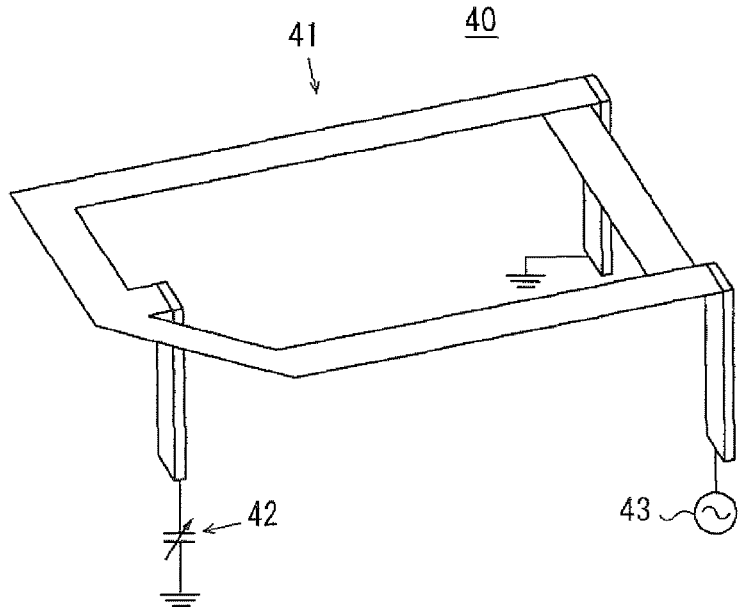
FIG. 4 is a schematic diagram showing another receiver different from the receiver shown in FIG. 2.

As exemplarily shown in FIG. 4, the antenna element 41 may be a pentagonal loop having five looped plate parts and three leg sections. According to the antennal element 41 of this pentagonal loop shape, the direction of current flow and the directivity can be varied by controlling the capacitances of the variable capacitor 42.

Each antenna element 41 shown in FIGS. 2 and 4 has respective branch parts, where the current supplied from the power source section 43 is branched or divided to flow into two directions. The branch part is formed at a location where, for example, the leg section 46*d* is connected to the plate parts 45*a* and 45*d*. If the variable capacitor 42 is provided at a downstream side from the branch part, it becomes possible to divide or not divide the current. Therefore, the directivity can be changed comparatively largely.

The antenna element 41 need not have a branch part. In one example, a variable capacitor is connected to one end of a looped single line antenna and the power supply source is connected to the other end of the looped single line antenna. If the capacitance of the variable capacitor is set sufficiently small, the directivity of the line antenna is provided. If the capacitance of the variable capacitor is set sufficiently large, the directivity of the loop antenna (magnetic current antenna) is provided. If the capacitance of the line antenna element is set to an intermediate capacitance, the directivity will also become intermediate between the directivities of the line antenna and the loop antenna.

The variable capacitor 42 used as the variable impedance element may be replaced with a trimmer capacitor. Further, an inductor may be connected to the variable capacitor 42 or the trimmer capacitor thereby to adjust the reactance.

Although the variable capacitor or the variable inductor is preferred because they have less high frequency loss, a variable resistor may also be used as the variable impedance element if the high frequency loss is not so critical.

What is claimed is:

1. A tire air pressure monitoring system for a vehicle comprising:
    a plurality of transmitters provided near tires of a vehicle, each of the transmitters including a tire air pressure sensor for detecting an air pressure of the tire, the transmitter transmitting as a radio wave a transmission signal indicating the air pressure detected by the tire air pressure sensor;
    a receiver for receiving the transmission signal from each transmitter so that a tire air pressure of each tire is monitored based on the transmission signal received by the receiver;
    the receiver including an antenna element, a variable impedance element coupled to the antenna element, and a power supply source for supplying the antenna element with electric power; and
    a directivity control section configured to control directivity of the receiver by controlling a voltage supplied to the variable impedance element.

2. The tire air pressure monitoring system according to claim 1, wherein:
    each transmitter transmits a transmitter-identifying ID signal in the transmission signal; and
    the directivity control section checks whether the transmission signal has been received from all of the transmitters, and varies the voltage supplied to the variable impedance element when no transmission signal has been received from at least one of the transmitters.

3. The tire air pressure monitoring system according to claim 1, wherein:
    the variable impedance element is a variable capacitor.

4. The tire air pressure monitoring system according to claim 2, wherein:
    each transmitter includes a trigger unit for generating a trigger signal, which instructs transmission of the transmission signal; and
    a transmission instruction section for instructing a transmission of the trigger signal of the trigger unit; and
    the directivity control section checks whether the transmission signal has been received from all of the transmitters based on whether the ID signal of the transmitter corresponding to the trigger unit, which has been instructed to transmit the trigger signal, has been received by the receiver.

5. The tire air pressure monitoring system according to claim 2, wherein:
    each transmitter transmits the transmission signal periodically at a predetermined transmission interval; and
    the directivity control section checks whether the transmission signal has been received from all of the transmitters based on the ID signal included in the transmission signal, which has been received by the receiver, within a predetermined check period.

\* \* \* \* \*